United States Patent
Bertschi et al.

[11] Patent Number: 5,590,753
[45] Date of Patent: Jan. 7, 1997

[54] RETAINING ELEMENT ON A CAROUSEL CONVEYOR WITH SEVERAL OUTLETS FOR SELECTIVE RETENTION OF CONVEYED CONTAINERS

[75] Inventors: Peter Bertschi, Urdorf; Peter Gysi, Bellikon, both of Switzerland

[73] Assignee: Elpatronic AG, Zug, Switzerland

[21] Appl. No.: 315,975

[22] Filed: Sep. 30, 1994

[30] Foreign Application Priority Data

Oct. 7, 1993 [CH] Switzerland ............... 3017/93
Nov. 8, 1993 [CH] Switzerland ............... 3355/93

[51] Int. Cl.⁶ .................................. B65G 47/84
[52] U.S. Cl. ........................ 198/441; 198/479.1
[58] Field of Search ............... 198/441, 370.01, 198/470.1, 478.1, 479.1, 473.1

[56] References Cited

U.S. PATENT DOCUMENTS

| | | |
|---|---|---|
| 2,602,533 | 7/1952 | Bruce ........................... 198/441 |
| 2,612,254 | 9/1952 | Carter. | |
| 2,787,359 | 4/1957 | Gerecke ........................ 198/441 |
| 3,687,285 | 8/1972 | Messervey ................ 198/441 X |
| 3,975,260 | 8/1976 | Peyton et al. ............. 198/441 X |
| 4,108,762 | 8/1978 | Babunovic et al. ....... 198/441 X |
| 4,467,908 | 8/1984 | Schneider .................... 198/441 |
| 5,096,042 | 3/1992 | Loll .............................. 198/441 |

FOREIGN PATENT DOCUMENTS

| | | |
|---|---|---|
| 0366225 | 5/1990 | European Pat. Off. . |
| 2820315 | 11/1979 | Germany . |
| 3040096 | 5/1982 | Germany . |
| 3741257 | 6/1989 | Germany . |
| 3838007 | 5/1990 | Germany . |

*Primary Examiner*—D. Glenn Dayoan
*Attorney, Agent, or Firm*—McCormick, Paulding & Huber

[57] ABSTRACT

The retaining element is extended from a carousel disk in the plane of the disk and holds a bottle to be retained by the carousel essentially only at one point (T). The retaining element can be provided with an easily exchangeable finger part thus permitting quick and easy adaptation to different bottle sizes. As the retaining element swings out against the bottle without touching it during the swinging action, there is no risk of damage to the bottle.

19 Claims, 11 Drawing Sheets

5,590,753

RETAINING ELEMENT ON A CAROUSEL CONVEYOR WITH SEVERAL OUTLETS FOR SELECTIVE RETENTION OF CONVEYED CONTAINERS

BACKGROUND OF THE INVENTION

The invention relates to a retaining element on a carousel conveyor with several outlets, for selectively retaining conveyed containers. It also relates to a carousel conveyor with a plurality of such retaining elements, as well as a bottle inspection apparatus with such a carousel conveyor.

DE-OS 3838007 discloses a sorting star-wheel for container handling machines. The individual containers are held in the pockets of the sorting star-wheel or carousel by pivoting locks which execute a pivoting movement in a plane parallel with the axis of the carousel. With this known method of holding the containers in the carousel, when a change of bottle size occurs, say from 1.5 liter to 0.5 liter, the entire carousel, with many parts, has to be exchanged. Also there is a possibility of the container surfaces becoming scratched or otherwise damaged by the pivoting locks.

SUMMARY OF THE INVENTION

It is therefore the fundamental object of the invention to provide a facility for retaining the containers on a carousel with which these drawbacks do not occur.

This is accomplished with a retaining element of the type stated at the outset in that the retaining element executes a movement essentially in a plane perpendicular to the axis of the carousel in order to retain or release the container.

Because the retaining element executes a movement essentially in the plane of a carousel disk, ie. in a plane perpendicular to the axis of the carousel, it is possible to arrange that only the foremost part of the retaining element needs to be replaced upon a change of container size. It also follows that it is possible to keep the retaining element completely clear of its container while moving to the retention point and ensure it does not come into contact with the container until it reaches the retention point, which can reliably prevent damage to the container. Also, the container is preferably retained in such a way that it is contacted by the retaining element essentially only at one point when being retained.

BRIEF DESCRIPTION OF THE DRAWINGS

Embodiments of the invention will now be explained in detail by way of example with reference to the drawings, in which.

BRIEF DESCRIPTION OF THE PREFERRED EMBODIMENTS

Figure 1:
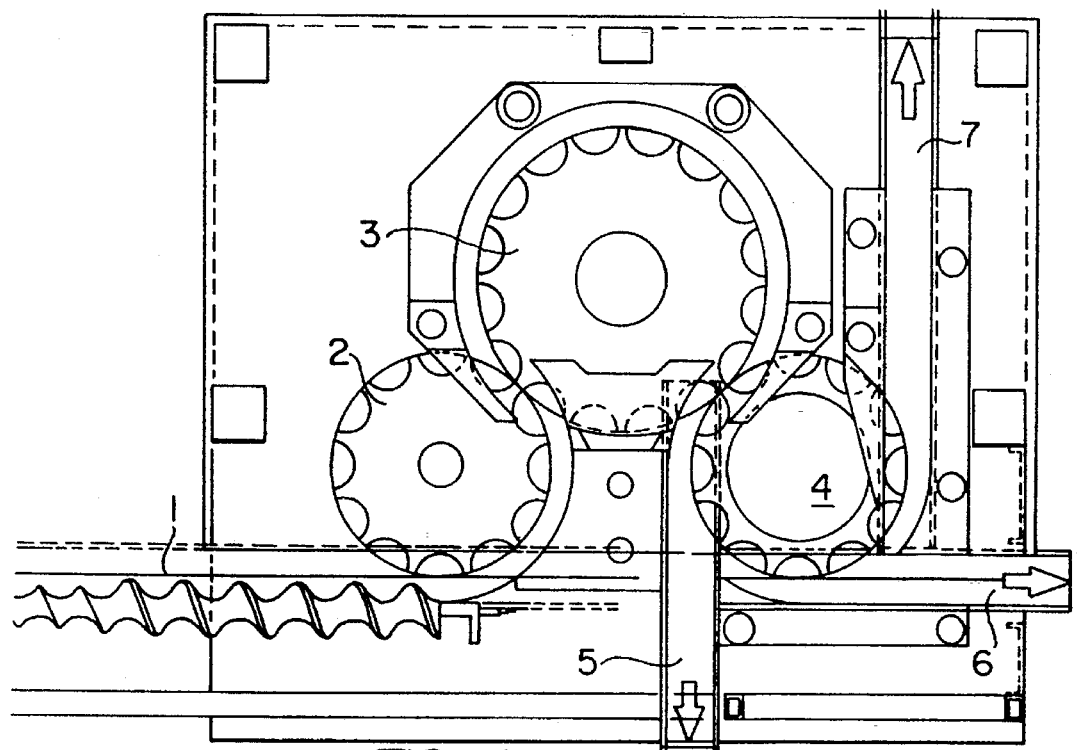
FIG. 1 schematically shows a bottle inspection machine with three bottle outlets, viewed from above.

As an example, an inspection machine for bottles, e.g. for returnable PET bottles, is illustrated in FIG. 1. The bottles pass via a feed conveyor 1 onto a feed carousel 2, main carousel 3, and discharge carousel 4. During the feed stage, and on the main carousel, the bottles undergo various known inspection procedures. For example, the bottles are checked as to height, and are tested for the presence of a cap, presence of residual water, presence of foreign bodies, etc. By means of the discharge carousel 4, the bottles are then assigned, in an upright position, to three different outlets 5,6,7. The outlets 5 and 6 may, for example, be provided for bottles which have not passed the inspections, and the outlet 7 for fault-free bottles which are forwarded for refilling. To retain the bottles in the discharge carousel 4 until they reach their assigned outlet point in the carousel, the retaining elements which will now be described are provided on the carousel 4.

Figure 2:
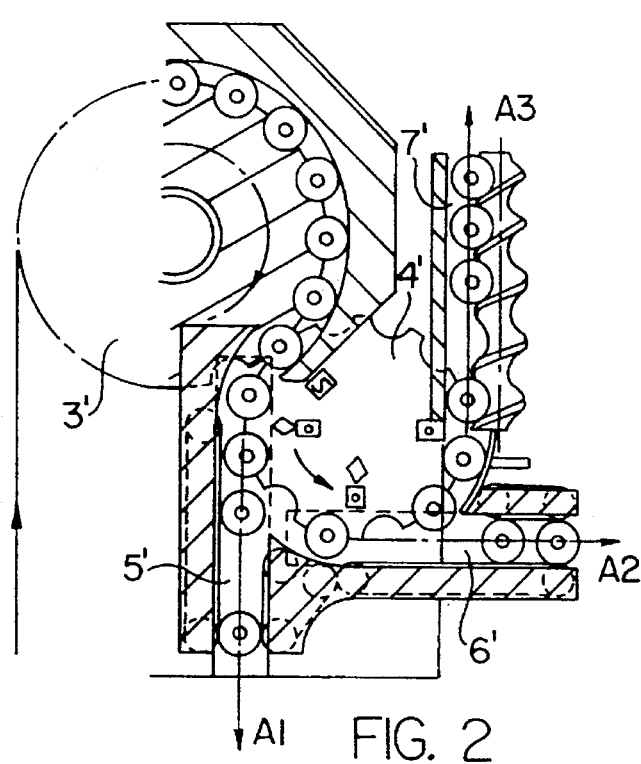
FIG. 2, which is likewise schematic, is a partial illustration of a carousel used as a sorting device, viewed from above.

FIG. 2 shows a further arrangement which can be provided for bottle testing and/or sorting. This also has a main carousel 3' feeding a discharge carousel 4'. Running out from the discharge carousel 4' are outlets 5'6' and, via a worm, outlet 7'. The distributing carousel 4' also has to be provided with corresponding retaining elements to keep each bottle in the carousel until it reaches its assigned outlet, and to release it at its assigned outlet.

Figure 3:
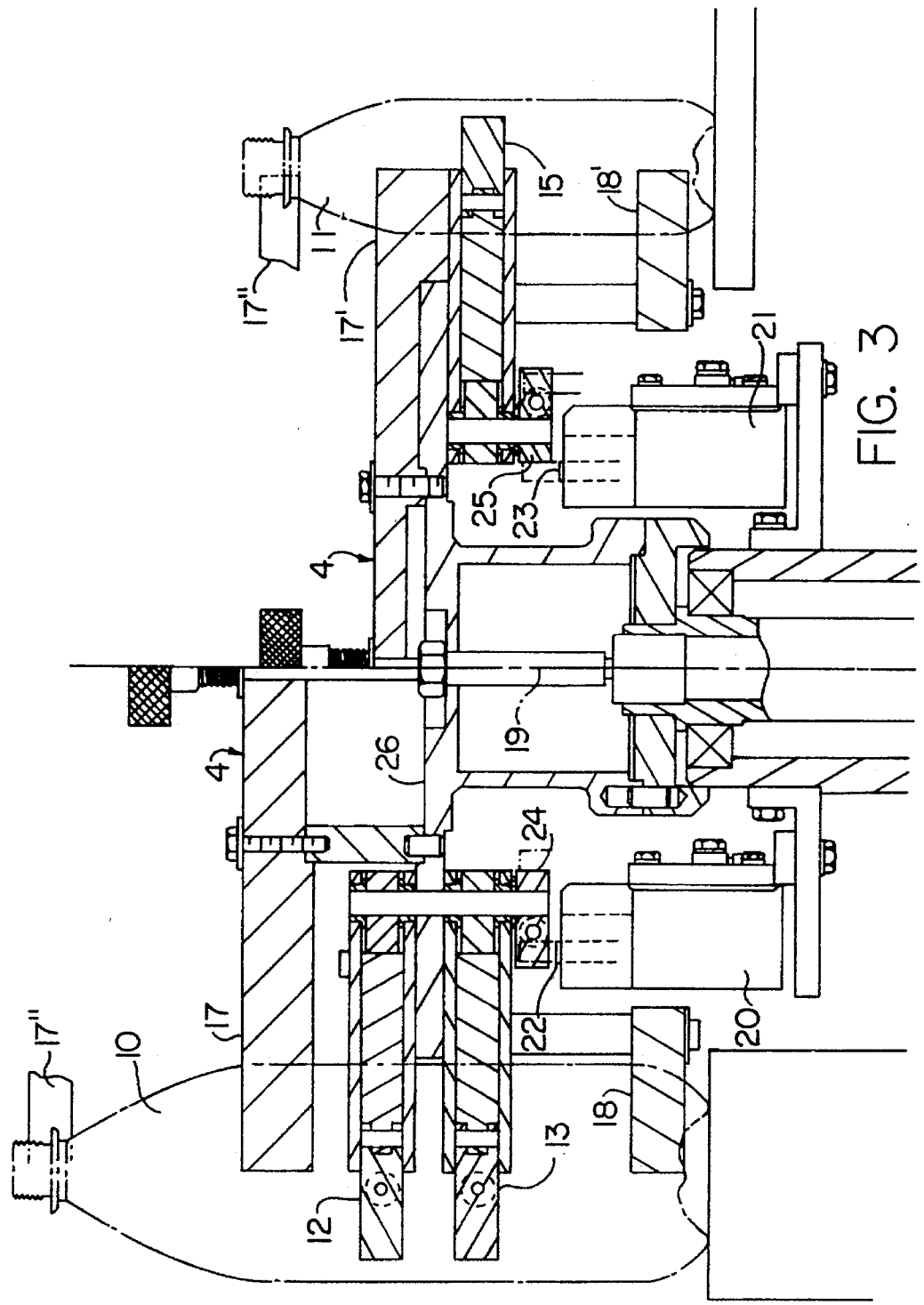
FIG. 3 shows a vertical section through a carousel for 1.5 liter bottles (to the left) and for 0.5 liter bottles (to the right)

FIG. 3 shows a vertical section through the discharge carousel 4, with the left half of the figure depicting the carousel set for large bottles 10, e.g. 1.5 liter bottles, and the right half depicting it set for small bottles 11, e.g., 0.5 liter bottles. Accordingly the carousel can be fitted with pairs of retaining elements 12,13 for large bottles; or with single retaining elements 15 for small bottles. Above and below the retaining elements are the holders (star-wheels) 17 and 18, and 17' and 18', respectively, forming the pockets of the carousel, which rotate about the central axis 19 of the carousel. The holders 17 to 18' are exchangeable, and also adjustable in height, for adaptation to different bottle sizes. In place of the exchangeable upper star-wheel 17,17' specific to a bottle size, it is also possible to provide a star-wheel 17" (only partly shown in the drawing), which is adjustable in height, to engage the bottle neck; this star-wheel does not need to be exchanged for different sizes of bottle.

Control elements 20 and 21 which control the retaining elements as explained in detail below are provided underneath the retaining elements 13 and 15, respectively, and are fixed to the machine, ie. they do not rotate with the carousel. This control is exerted by the electromagnetically or pneumatically upwardly extensible control pins 22 and 23 of the control elements 20 and 21, respectively, which can be brought into engagement with control vanes or levers 24 and 25, respectively, to control the retaining elements. The control vanes 24 and 25 are pivotably mounted on the carousel disk 26, and a pivoting movement is imparted to them when they are carried past the extended pins 22 and 23 of the control devices by the rotation of the carousel. This is illustrated in plan view in FIG. 4, which shows three of the total of twelve control vanes each in two different positions.

The control vane 24 is shown in front of the outlet 6, and can be moved by the controllable pin 22 from a first position into the second position indicated at 24'. In the first position, indicated at 24, the control vane 24 is positioned so that the corresponding retaining element (which will be described presently) retains the object contained in the pocket of the carousel. In the position of the control vane indicated at 24', the corresponding retaining element is retracted, so that it no longer retains the container, which runs out into the outlet 6 as the carousel rotates. In this way the control pin 22 determines whether or not the container passes into the outlet 6. The same applies to the outlet 5 in respect of the control vane 30, of which a first position is indicated at 30 and a second position at 30'. This control vane is controlled by the pin 31. When this pin is extended upwards, it causes the control vane to pivot from the position 30 to the position 30', thus causing (as will be described presently) the retaining element to close, thus retaining the container. Hence bottles entering the discharge carousel from the curved track 3" of the main carousel are, under the control of the pin 31, either retained by the retaining element so that the bottle is carried past the outlet 5 with the carousel; or not retained by the retaining element, so that the bottle passes, unassisted, into the outlet 5.

Figure 4:
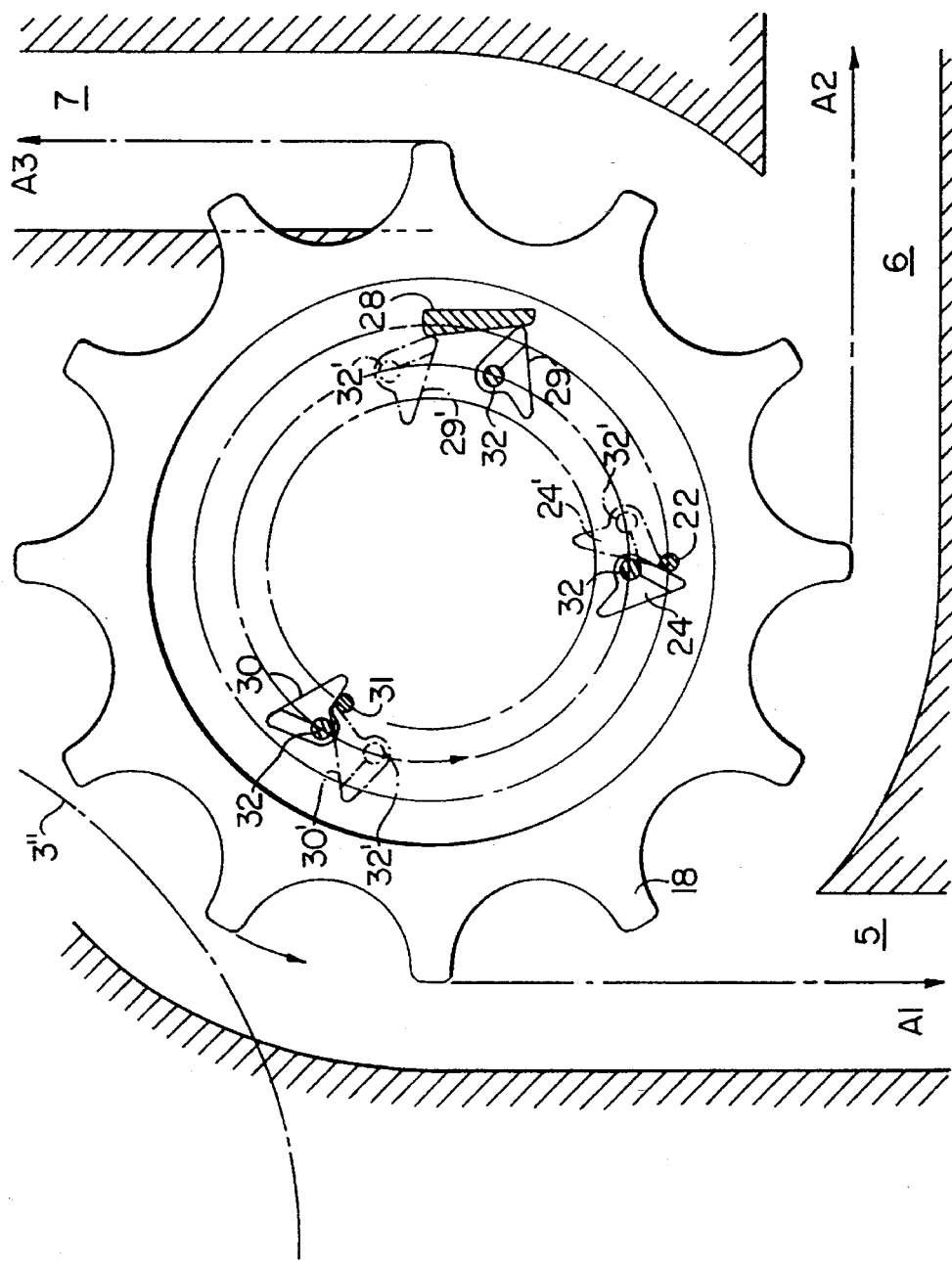
FIG. 4 shows a top view of the control plane of the carousel.

Those bottles which upon entering the discharge carousel have been kept in the carousel by the control pin 31 acting on the retaining element, and have not been released into the outlet 6 by the control pin 22 acting on the retaining element, proceed to the outlet 7, where arrangements must be provided for releasing the retaining element. This is performed by a fixed cam 28 which shifts the individual control vane or lever so that the retaining elements open. The control levers 29 and 29' illustrated in FIG. 4 show the pivoting movement brought about by the cam 28 and causing the retaining element to open.

Figure 5:
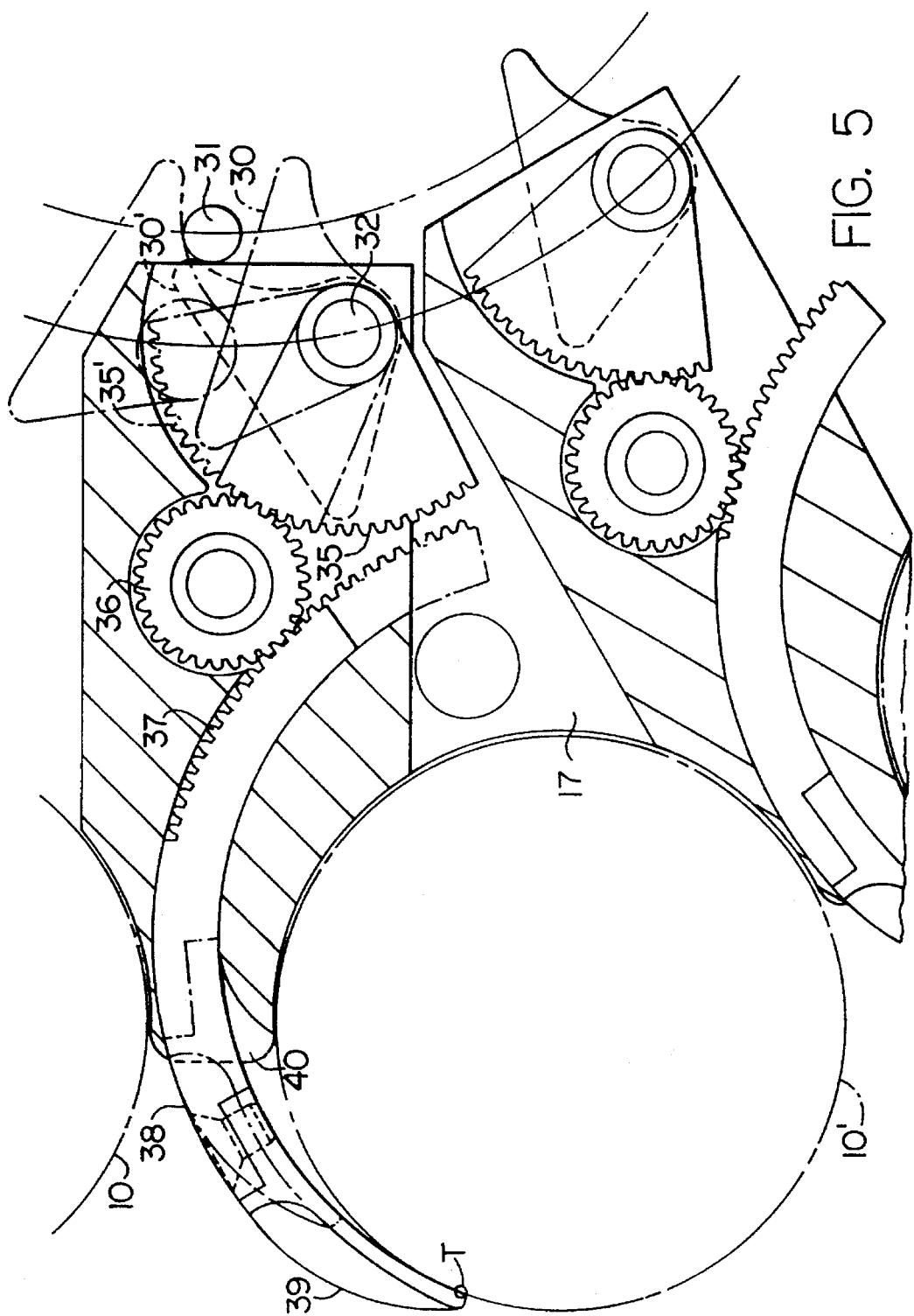
FIG. 5 shows a view of a first embodiment of the retaining element.

A first embodiment of the retaining element operated by the control vanes or levers will now be described with reference to FIG. 5. In FIG. 5, the control lever 30, which can be turned about the pivot 32 by the closure pin 31, is drawn in chain-dotted outline. Mounted on this pivot 32 is a toothed segment 35 which is designated in one position as 35 and in its other position as 35'. Position 35 corresponds to closure of the retaining element by the pin 31. A toothed wheel 36 meshing with the toothed segment 35 operates the actual retaining element 38, which is arc-shaped and is provided in its rear region with toothing 37 which meshes with the toothing of the wheel 36. The retaining element 38 is provided at its forward end with an exchangeable retaining finger 39. As can be seen from the figure, when the closing pin 31 projects upwards and pivots the control lever 30 into the position 30' when the latter passes the pin, the retaining element 38 is extended forwards in a circular arc from its retracted position between successive bottles 10,10' over the front edge 40 of the carousel star in the plane of the carousel disk, ie. in the plane perpendicular to the axis of the carousel. The toothed segment is turned from the position 35' to the position 35, extending the retaining element, which then contacts the bottle 10' with its finger 39 at the point T and retains the bottle in the pocket of the carousel. A control circuit, which either extends or does not extend the pin 31 according to the outcome of the bottle inspection, determines through the action of the pin 31 whether or not the bottle 10' is retained in the carousel by the retaining element 38. If it is retained, the illustrated bottle 10' continues at least to the next outlet 6, and does not pass into the outlet 5.

Figure 6:
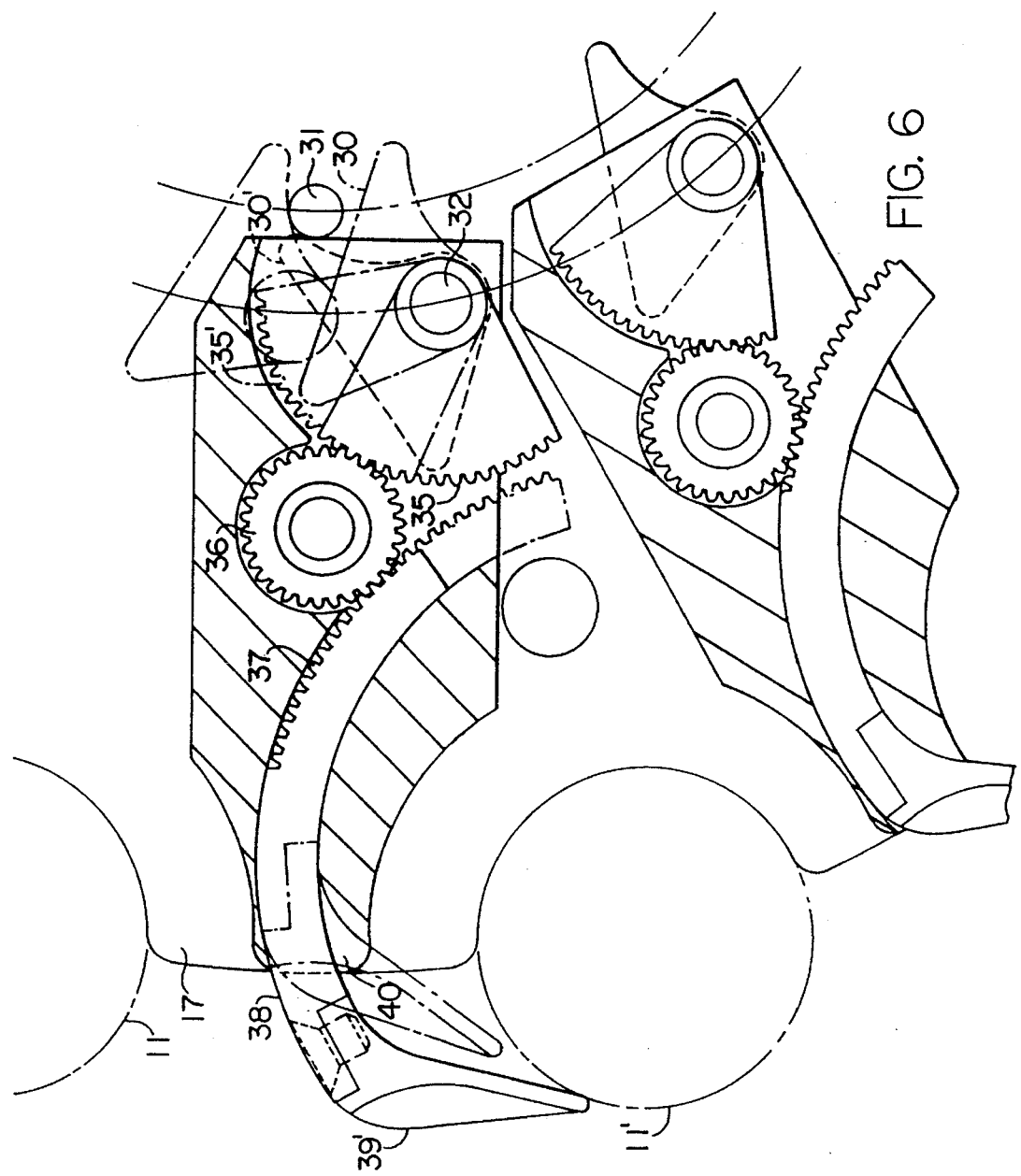
FIG. 6 shows the embodiment of FIG. 5 adapted for smaller containers.

FIG. 6 shows the same arrangement of the retaining element 38, similar parts being designated with the same reference symbols as in FIG. 5. Here, however, it can be seen that the retaining element is provided with a modified finger 39'. This enables smaller bottles 11 and 11' to be retained. It will be seen that with the retaining device which extends in a plane of the carousel, adaptation to small bottles sizes can be made merely by changing the front part 39'. This is a major advantage of the retaining elements according to the invention. With the smaller bottle size also, the bottle is retained essentially at a single point, and, in exactly the same way as with the retaining element in FIG. 5, there is no risk of scratching the bottle 10' or 11' when extension of the retaining element occurs.

Figure 7:
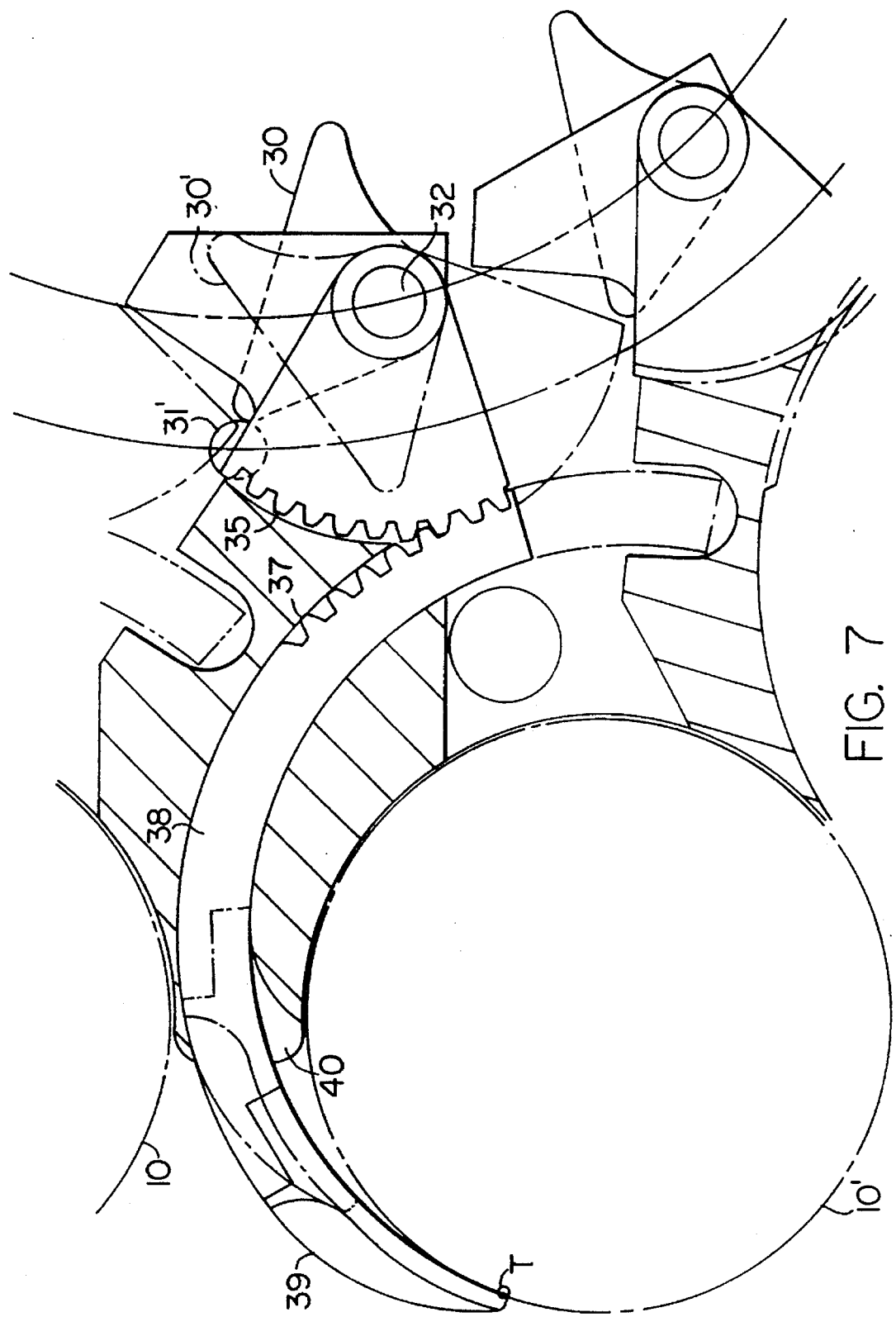
FIG. 7 shows another embodiment of the retaining element.

FIG. 7 shows a simplified embodiment of the retaining element according to FIGS. 5 and 6. Similar elements are again designated with the same reference numbers. The toothed wheel 36 is eliminated in this embodiment. This results in a reversal of the action of the control cam. Accordingly, extension of the retaining element is now effected by the control pin 31' which is located on the opposite side of the pivot of the control cam 30 to the control pin 31 according to FIGS. 5 and 6.

Figure 8:
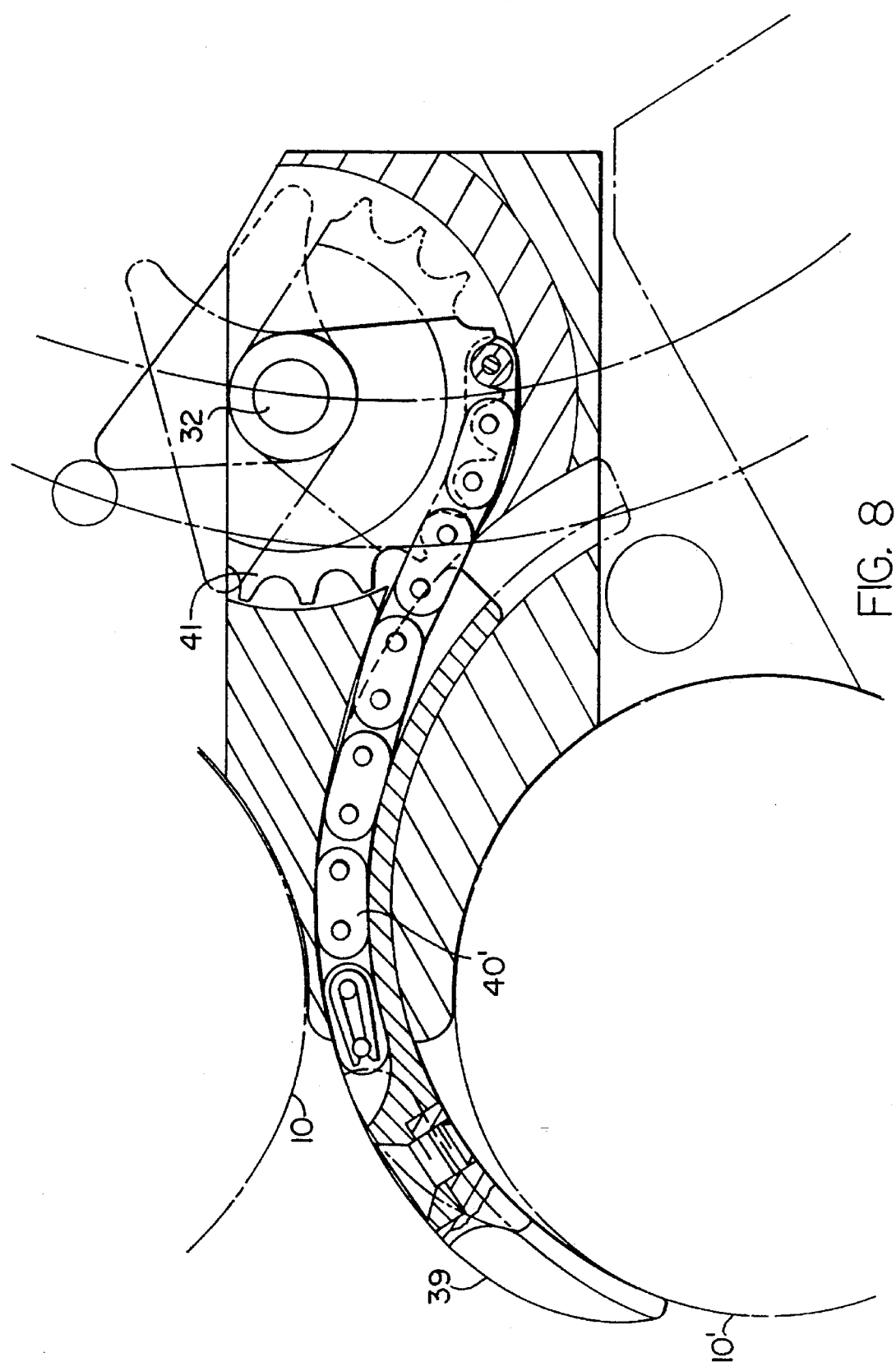
FIG. 8 shows a further embodiment of the retaining element.

FIG. 8 shows a further embodiment of retaining element; in this case, the rear part of the retaining element connected to the finger 39 is constituted by a guided flexible element 40'. In FIG. 8 this is a length of chain 40' driven by a chain wheel 41. The chain wheel 41 is actuated in turn by the control vane, as has already been described with reference to the preceding embodiments. Instead of the chain 40', a toothed belt or a spring steel strip, a spring, or a Bowden cable, could also be used as the flexible element. This retaining element also possesses the aforementioned advantages that only the front part 39 needs to be replaced when there is a change of bottle size, and that the extension action in the plane perpendicular to the axis of the carousel involves no risk of damage to the bottle retained.

Figure 9:
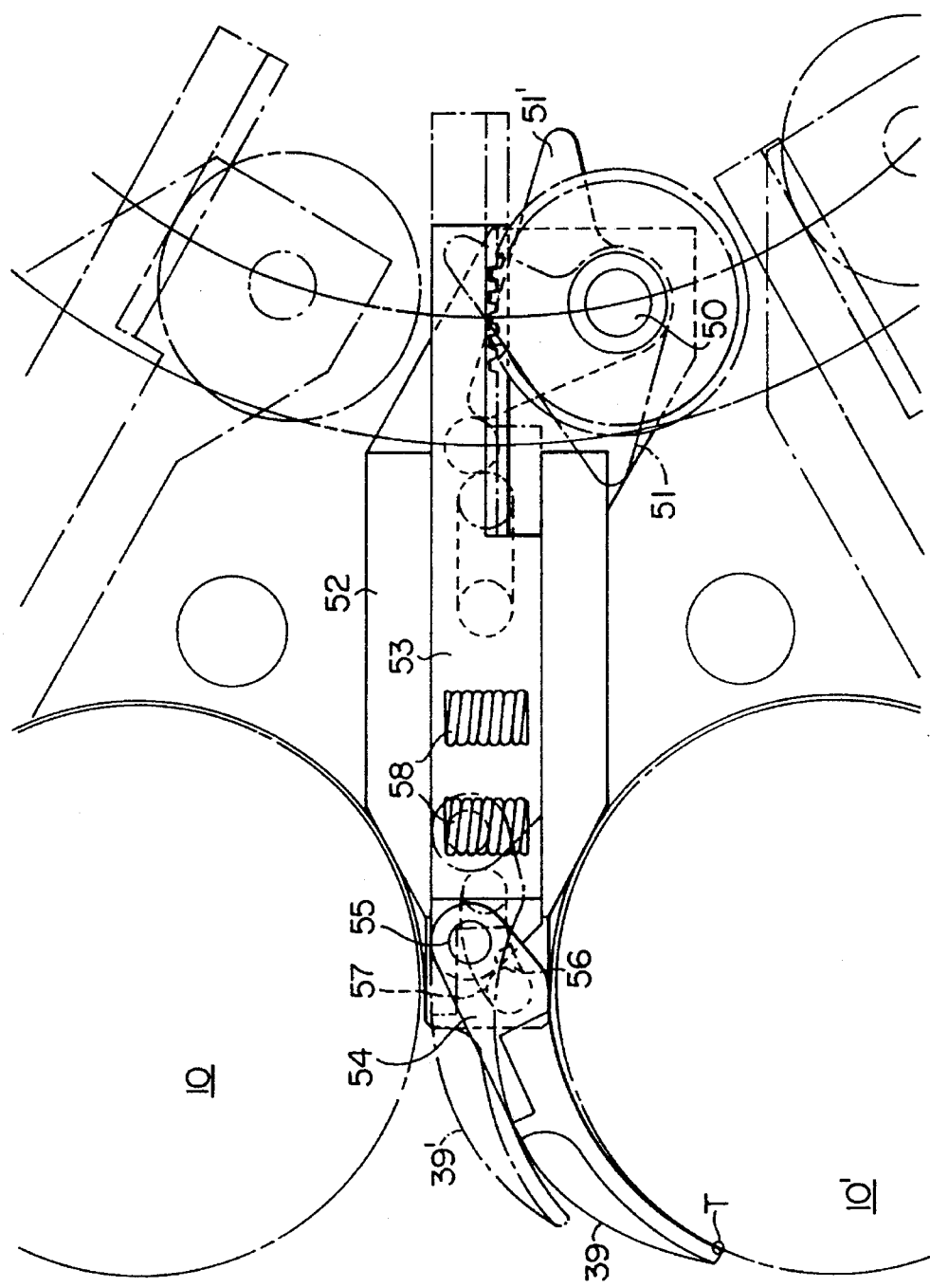
FIG. 9 shows yet another embodiment of the retaining element.

FIG. 9 shows a further embodiment of retaining element. Here similarly, a control vane or cam 51 and 51' pivotably mounted on the pivot 50 is illustrated which is actuated by the control pins in the manner which has already been described. In this case a bar 53 which can be slid along a linear guide 52 is provided as the retaining element. The front end of the bar 53 is fitted with a swivel part 54 to Which the finger 39 is attached. The swivel part 54 is pivotable about a pivot 55. Pivoting of the swivel part 54 is derived from the linear motion of the bar 53 imparted by the control vane, by a curved cam slot 56 into which a pin 57 on the swivel part 54 engages. Upon extension of the bar 53, this causes the finger 39 to pivot about the pivot 55 so that the finger, illustrated in the retracted condition at 39', again makes essentially point contact with the bottle 10' at the point T upon extension of the bar 53, and does so without contacting the bottle at any other point and thus possibly causing damage as it is extended. In order to secure the bar 53 in the guide 52 with friction to prevent undesired displacement (ie. displacement not effected by the control vane), compression springs 58 can be provided to press against the side walls of the guide in order to prevent looseness of the bar 53 in the guide 52. These springs may also be arranged in the guide to reduce the mass of the moving parts. Similar damping elements may be provided to inhibit free movement in the other embodiments which have been described; for example, these elements may act on the control vanes or levers.

Figure 10:
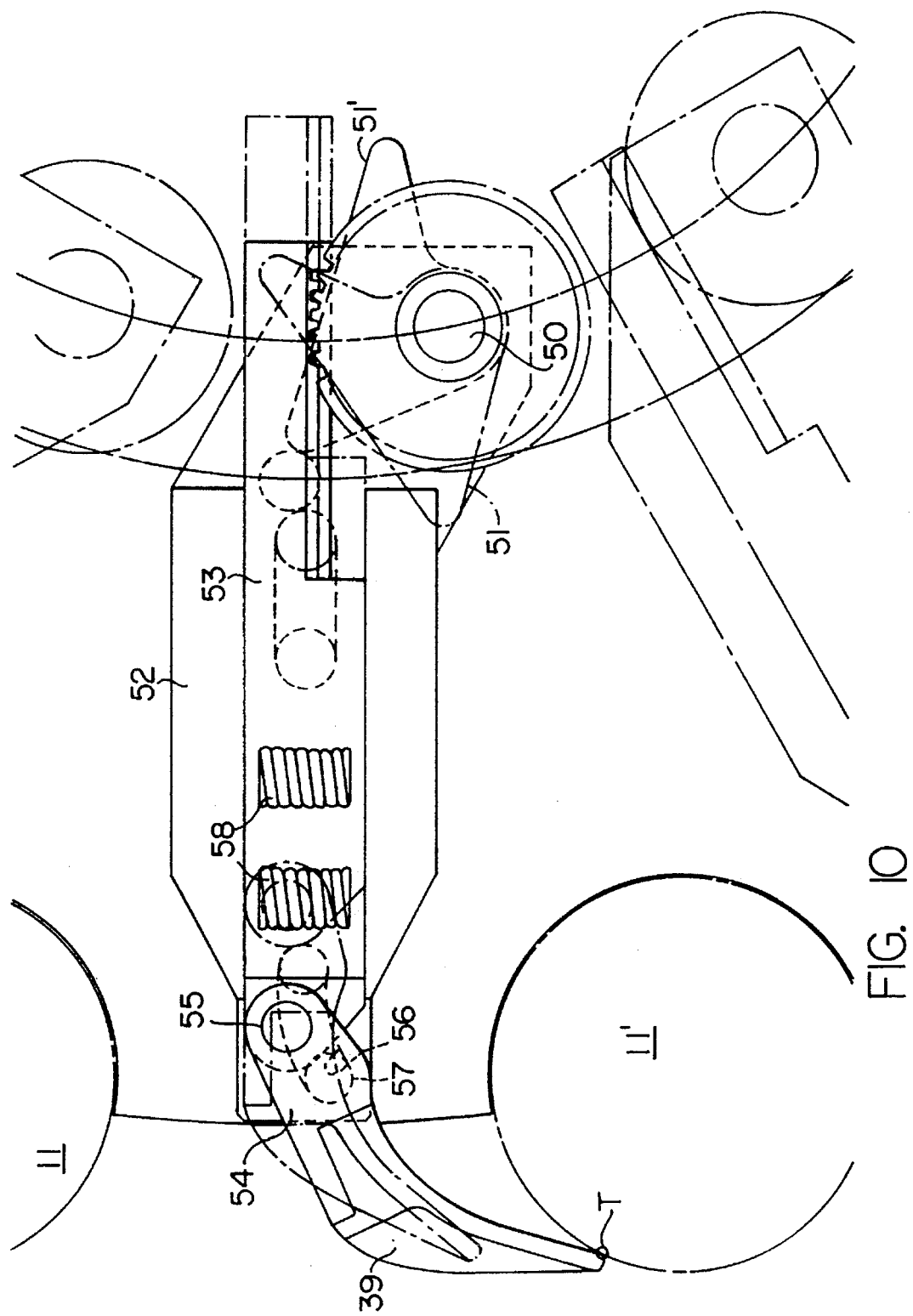
FIG. 10 shows the retaining element of FIG. 9 for smaller containers.

FIG. 10 shows the same embodiment as FIG. 9, but has a modified finger part 39 attached to the swivel part 54, this modified finger part enabling small bottles 11' to be retained.

Figure 11:
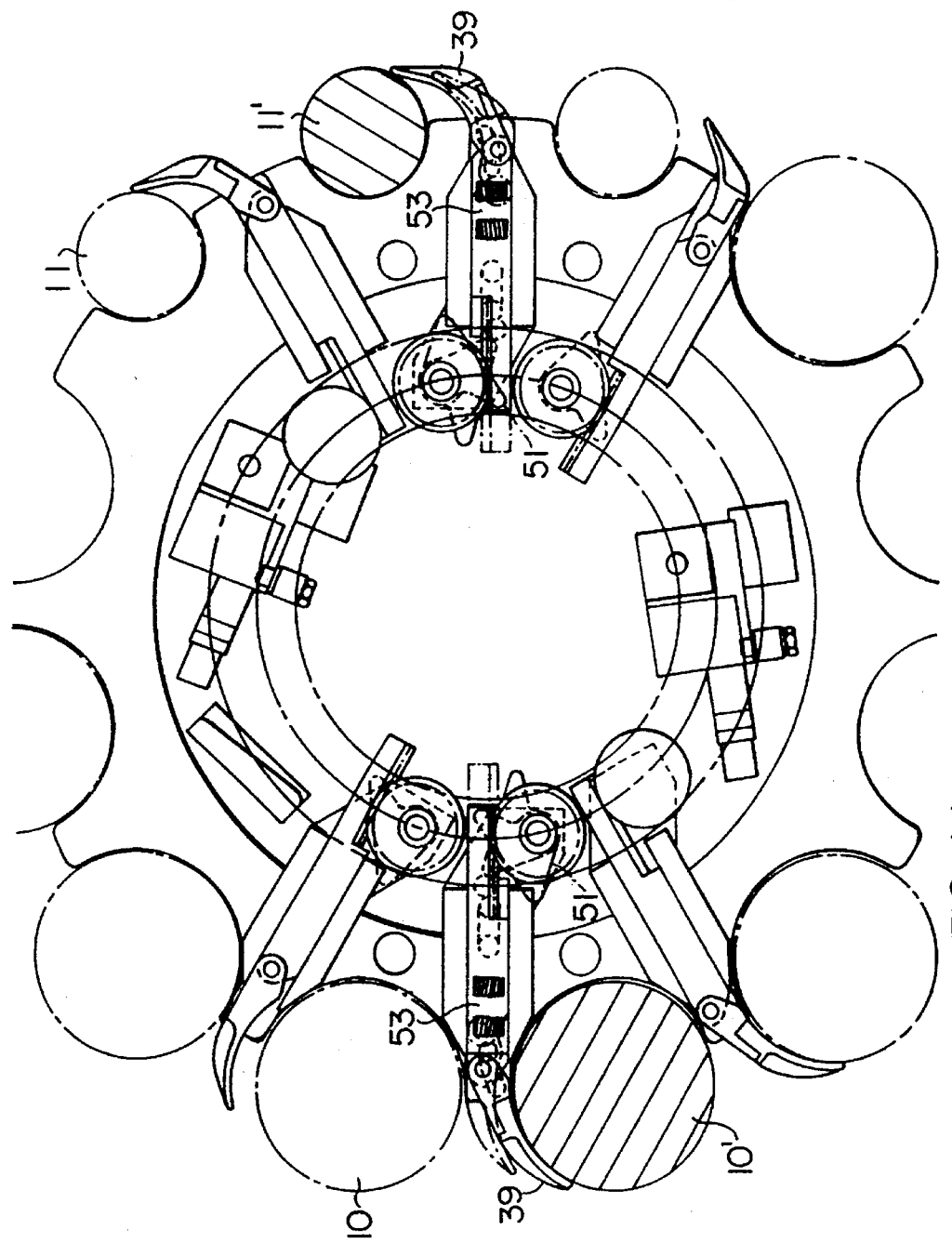
FIG. 11 shows a view of the carousel in which the retaining elements of FIGS. 9 and 10 are both illustrated.

FIG. 11 also shows a top view of the carousel with retaining elements according to FIGS. 9 and 10, the left half of FIG. 11 depicting retaining elements provided with fingers for larger bottles 10 and the right half of the figure depicting the same retaining elements provided with fingers for smaller bottles 11. Of course, only one or other type of finger would actually be used as the carousel is set for bottles of one size. FIG. 11 is merely intended to demonstrate that with the retaining elements shown only the finger part 39 needs to be exchanged when resetting the elements to other bottle sizes.

Figure 12:
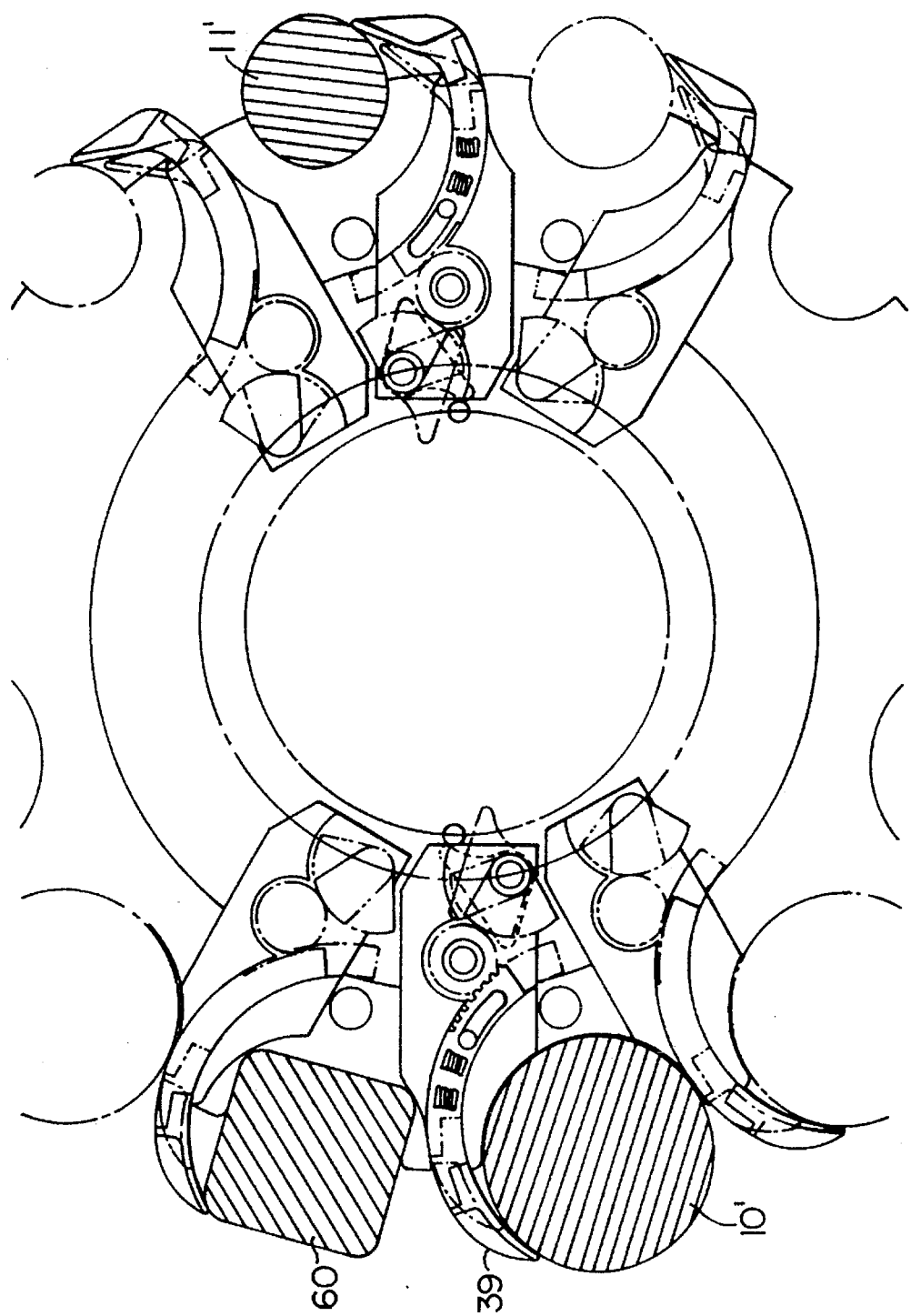
FIG. 12 shows a view of the carousel in which the retaining elements of FIGS. 5 and 6 are illustrated.

FIG. 12 is a similar view to FIG. 11, in this case with curved retaining elements as described with reference to FIGS. 5 and 6. In this case these retaining elements are also provided with compression springs to hold them securely in their guides. It will also be noticed from FIG. 12 that even a container 60 whose shape is not round can be held in the carousel by the retaining elements. Thus the retaining elements according to the invention and carousels to which these are fitted need not be restricted to round bottles, cans or similar containers; square bottles, cans or other containers can also be securely retained by the retaining elements. The same is true of other shapes, e.g. triangular shapes.

We claim:

1. Carousel conveyor comprising:

a plurality of outlets distributed about an axis of rotation of the carousel conveyor for containers released from the carousel conveyor, a plurality of retaining means arranged in at least one common plane to execute a movement perpendicular to the axis of rotation in order to retain or release a container, each retaining means being arranged to contact a retained container and including a guide and a straight sliding part received in the guide by means of friction dampers, the sliding part being displaceable in a direction generally perpendicular to the axis of rotation, and further including a retaining finger mounted adjacent to one end of the sliding part and a cam associated with the other end of the sliding part in order to slidably displace the sliding part and retaining finger and move the retaining finger into or away from contact with the container, and control members arranged below the common plane and associated with the cams, the control members selectively striking stops fixed relative to the carousel conveyor for selectively actuating the cams and moving the retaining means in order to retain or release the containers.

2. Carousel conveyor according to claim 1, characterized in that it has a basic element independent of bottle size, on which retaining elements independent of bottle size are arranged, and in that size-specific star-wheel(s) and a size-specific finger on each retaining element, are provided.

3. Carousel conveyor according to claim 1, characterized in that it has a basic element independent of bottle size, on which are arranged retaining elements independent of bottle size and an upper star-wheel which is independent of bottle size and is vertically adjustable, and in that it also has a size-specific lower star-wheel and a size-specific finger (39) on each retaining element.

4. The carousel conveyor according to claim 1, wherein the retaining means contact a container at only one contact point.

5. The carousel conveyor according to claim 1, wherein the retaining finger is releasably mounted to the sliding part.

6. The carousel conveyor according to claim 1, wherein the retaining finger is pivotally mounted to the sliding part.

7. Carousel conveyer comprising:

a plurality of outlets distributed about an axis of rotation of the carousel conveyor for containers released from the carousel conveyer;

a plurality of retaining means arranged in at least one common carousel plane to execute a movement perpendicular to the axis of rotation in order to retain or release a container, each retaining element being arranged to contact a retained container and including a guide and a rigid, arcuate sliding part received in the guide by means of friction dampers, the sliding part being displaceable in a direction generally perpendicular to the axis of rotation, and further including a retaining finger mounted adjacent to one end of the sliding part and a cam associated with the other end of the sliding part in order slidably displace the sliding part and retaining finger and move the retaining finger into or away from contact with the container, and control members arranged below the common plane and associated with the cams, the control members selectively striking stops fixed relative to the carousel conveyer for selectively actuating the cams and moving the retaining means in order to retain or release the containers.

8. Carousel conveyer according to claim 7, further characterized by a basic element upon which the retaining elements are mounted, the basic element rotating about the axis of rotation and capable of receiving bottles of various sizes, and upper and lower starwheels separated form one another by a distance and mounted on and rotating with the basic element, the upper starwheel being sized independently of the size of the bottles and moveable relative to the lower star wheel in the direction the axis of rotation to adjust the distance between the upper and lower starwheels, the lower star wheel being sized accordance with the size of the bottles, wherein the fingers have a size in accordance with the size of the bottles.

9. Carousel conveyer according to claim 7, further characterized by a basic element upon which the retaining elements are mounted, the basic element rotating about the axis of rotation and capable or receiving bottles of various sizes, and upper and lower starwheels mounted on and rotating with the basic element, wherein the retaining elements and associated fingers are sized in accordance with the size of the bottles.

10. The carousel conveyer according to claim 7, wherein the retaining finger is releasably mounted to the sliding part.

11. The carousel conveyer according to claim 7, wherein the retaining finger is pivotally mounted to the sliding part.

12. The carousel conveyer according to claim 7, wherein the retaining means contact a container at only one contact point.

13. Carousel conveyor comprising:

a plurality of outlets distributed about an axis of rotation of the carousel conveyor for containers released from the carousel conveyor;

a plurality of retaining means arranged in at least one common carousel plane to execute a movement perpendicular to the axis of rotation in order to retain or release a container, each retaining element being arranged to contact a retained container and including a guide and a flexible sliding part received in the guide by means of friction dampers, the sliding part being displaceable in a direction generally perpendicular to the axis of rotation, and further including a retaining finger mounted adjacent to one end of the sliding part and a cam associated with the other end of the sliding part in order slidably displace the sliding part and retaining finger and move the retaining finger into or away from contact with the container, and control members arranged below the common plane and associated with the cams, the control members selectively striking stops fixed relative to the carousel conveyor for selectively actuating the cams and moving the retaining means in order to retain or release the containers.

14. Carousel conveyor according to claim 13, further characterized by a basic element upon which the retaining elements are mounted, the basic element rotating about the axis of rotation and capable or receiving bottles of various sizes, and upper and lower starwheels separated form one another by a distance and mounted on and rotating with the basic element, the upper starwheel being sized independently of the size of the bottles and moveable relative to the lower star wheel in the direction the axis of rotation to adjust the distance between the upper and lower starwheels, the lower star wheel being sized accordance with the size of the bottles, wherein the fingers are sized in accordance with the size of the bottles.

15. Carousel conveyor according to claim 13, further characterized by a basic element upon which the retaining elements are mounted, the basic element rotating about the axis of rotation and capable or receiving bottles of various sizes, and upper and lower starwheels mounted on and rotating with the basic element, wherein the retaining elements and associated fingers are sized in accordance with the size of the bottles.

16. The carousel conveyor according to claim 13, wherein the retaining finger is releasably mounted to the sliding part.

17. The carousel conveyor according to claim 13, wherein the retaining finger is pivotally mounted to the sliding part.

18. The carousel conveyor according to claim 13, wherein the retaining means contact a container at only one contact point.

19. Carousel conveyor comprising:

a plurality of outlets distributed about an axis of rotation of the carousel conveyor for containers released from the carousel conveyor, a plurality of retaining means arranged in at least one common plane to execute a movement perpendicular to the axis of rotation in order to retain or release a container, each retaining means including a guide and a sliding part received in the guide by means of friction dampers, the sliding part being displaceable in a direction generally perpendicular to the axis of rotation, and further including a retaining finger mounted adjacent to one end of the sliding part and a cam associated with the other end of the sliding part in order slidably displace the sliding part and associated retaining finger and move the retaining finger into or away from contact with the container, and control members arranged below the common plane and associated with the cams, the control members selectively striking stops fixed relative to the carousel conveyor for selectively actuating the cams and moving the retaining means in order to retain or release the containers.

* * * * *